(12) United States Patent
Matsen et al.

(10) Patent No.: US 9,586,362 B2
(45) Date of Patent: Mar. 7, 2017

(54) THERMOPLASTIC WELDING APPARATUS AND METHOD

(75) Inventors: Marc R. Matsen, Seattle, WA (US); Mark A. Negley, Bellevue, WA (US); William Preston Geren, Shoreline, WA (US); Robert James Miller, Fall City, WA (US)

(73) Assignee: The Boeing Company, Chicago, IL (US)

(*) Notice: Subject to any disclaimer, the term of this patent is extended or adjusted under 35 U.S.C. 154(b) by 151 days.

(21) Appl. No.: 13/109,061

(22) Filed: May 17, 2011

(65) Prior Publication Data

US 2012/0291948 A1 Nov. 22, 2012

(51) Int. Cl.
*B29C 65/36* (2006.01)
*B29C 65/34* (2006.01)
(Continued)

(52) U.S. Cl.
CPC ...... *B29C 65/3644* (2013.01); *B29C 65/3612* (2013.01); *B29C 65/3676* (2013.01); *B29C 66/1122* (2013.01); *B29C 66/474* (2013.01); *B29C 66/524* (2013.01); *B29C 66/721* (2013.01); *B29C 66/7392* (2013.01); *B29C 66/73921* (2013.01); *B29C 66/8126* (2013.01); *H05B 6/105* (2013.01); *B29C 65/3668* (2013.01); *B29C 66/00145* (2013.01); *B29C 66/7212* (2013.01); *B29C 66/7394* (2013.01); *B29C 66/8122* (2013.01); *B29C 66/81457* (2013.01); *B29K 2995/0008* (2013.01); *H05B 2206/023* (2013.01)

(58) Field of Classification Search
CPC .......... H05B 6/10; H05B 6/101; H05B 6/105; B29C 33/06; B29C 65/36; B29C 65/34

USPC ... 156/272.2, 272.4, 285, 379.6, 379.7, 381; 219/633; 264/403
See application file for complete search history.

(56) References Cited

U.S. PATENT DOCUMENTS 3,730,804 A * 5/1973 Dickey ..................... 56/272.4
4,521,659 A 6/1985 Buckley et al.
(Continued)

FOREIGN PATENT DOCUMENTS

JP H06509293 10/1994
JP 09129429 5/1997
(Continued)

OTHER PUBLICATIONS hpmetals.com/download/Moly-Pernalloy.pdf, Hamilton Precision Metals 1991, accessed Jun. 15, 2012.*
(Continued)

*Primary Examiner* — Michael N Orlando
*Assistant Examiner* — Elizabeth Bradford
(74) *Attorney, Agent, or Firm* — Hanley, Flight & Zimmerman, LLC

(57) ABSTRACT

A thermoplastic welding apparatus includes a thermoplastic welding tool, at least one tooling surface in the thermoplastic welding tool, a magnetic induction coil in the thermoplastic welding tool and generally encircling the at least one tooling surface and at least one smart susceptor in the thermoplastic welding tool at the at least one tooling surface. The magnetic induction coil is adapted to generate a magnetic flux field oriented generally parallel to a plane of the at least one smart susceptor.

25 Claims, 4 Drawing Sheets

(51) Int. Cl.
  *H05B 6/10* (2006.01)
  *B29C 65/00* (2006.01)

(56) References Cited

U.S. PATENT DOCUMENTS

| | | | |
|---|---|---|---|
| 5,182,427 A * | 1/1993 | McGaffigan | 219/663 |
| 5,240,542 A | 8/1993 | Miller et al. | |
| 5,313,037 A | 5/1994 | Hansen et al. | |
| 5,530,227 A * | 6/1996 | Matsen et al. | 219/633 |
| 5,556,565 A * | 9/1996 | Kirkwood et al. | 219/633 |
| 5,624,594 A | 4/1997 | Matsen et al. | |
| 5,641,422 A | 6/1997 | Matsen et al. | |
| 5,645,744 A | 7/1997 | Matsen et al. | |
| 5,710,414 A | 1/1998 | Matsen et al. | |
| 5,723,849 A | 3/1998 | Matsen et al. | |
| 5,728,309 A | 3/1998 | Matsen et al. | |
| 5,847,375 A | 12/1998 | Matsen et al. | |
| 6,040,563 A | 3/2000 | Matsen et al. | |
| 6,142,520 A * | 11/2000 | Iino et al. | 280/743.1 |
| 6,528,771 B1 | 3/2003 | Matsen et al. | |
| 6,566,635 B1 | 5/2003 | Matsen et al. | |
| 6,884,975 B2 * | 4/2005 | Matsen et al. | 219/615 |
| 6,884,976 B2 | 4/2005 | Matsen et al. | |
| 8,980,029 B1 | 3/2015 | Nigro et al. | |
| 2004/0099660 A1 | 5/2004 | Matsen et al. | |
| 2005/0035115 A1 | 2/2005 | Anderson et al. | |

FOREIGN PATENT DOCUMENTS

| | | |
|---|---|---|
| WO | 9302849 | 2/1993 |
| WO | 9821023 | 5/1998 |
| WO | 2012158293 | 11/2012 |

OTHER PUBLICATIONS

International Searching Authority, "International Search Report," issued in connection with application serial No. PCT/US2012/033794, mailed Jul. 25, 2012, 6 pages.

International Searching Authority, "Written Opinion of the International Searching Authority," issued in connection with international application serial No. PCT/US2012/033794, mailed Jul. 25, 2012, 6 pages.

State Intellectual Property Office of the People's Republic of China, "First Office Action," issued in connection with Chinese Application Serial No. 201280023719.6, on Mar. 27, 2015, 23 pages.

State Intellectual Property Office of PRC, "Notification of Second Office Action," issued in connection with Application No. 201280023719.6, Sep. 24, 2015, 16 pages.

Canadian Intellectual Property Office, "Office Action," issued in connection with Application No. 2,830,672, Oct. 16, 2015, 4 pages.

United States Patent and Trademark Office, "Advisory Action," issued in connection with U.S. Appl. No. 13/109,051, Jul. 22, 2013, 2 pages.

United States Patent and Trademark Office, "Final Office Action," issued in connection with U.S. Appl. No. 13/109,051, May 1, 2013, 9 pages.

United States Patent and Trademark Office, "Final Office Action," issued in connection with U.S. Appl. No. 13/109,051, Feb. 25, 2014, 16 pages.

United States Patent and Trademark Office, "Non-Final Office Action," issued in connection with U.S. Appl. No. 13/109,051, Jan. 4, 2013, 9 pages.

United States Patent and Trademark Office, "Non-Final Office Action," issued in connection with U.S. Appl. No. 13/109,051, Sep. 12, 2013, 13 pages.

United States Patent and Trademark Office, "Non-Final Office Action," issued in connection with U.S. Appl. No. 13/109,051, May 22, 2014, 14 pages.

United States Patent and Trademark Office, "Notice of Allowance," issued in connection with U.S. Appl. No. 13/109,051, Nov. 21, 2014, 9 pages.

United States Patent and Trademark Office, "Requirement for Restriction/Election," issued in connection with U.S. Appl. No. 13/109,051, Sep. 27, 2012, 6 pages.

Japanese Patent Office, "Notice of Reasons for Rejection," issued in connection with Application No. 2014-511371, Dec. 22, 2015, 6 pages.

State Intellectual Property Office of PRC, "Notification of Third Office Action," issued in connection with Application No. 201280023719.6, Jan. 18, 2016, 7 pages.

Canadian Patent Office, "Office action", issued in connection with Canadian Patent office No. 2,830,672, Jul. 7, 2016, 4 pages.

* cited by examiner

THERMOPLASTIC WELDING APPARATUS AND METHOD

This invention was made with Government support under contract number DE-FG36-08G018135 awarded by the United States Department of Energy. The government has certain rights in this invention.

CROSS-RELATED APPLICATION

This patent is related to U.S. patent application Ser. No. 13/109,051, filed on May 17, 2011, now U.S. Pat. No. 8,980,029, which is incorporated by reference herein in its entirety.

TECHNICAL FIELD

The disclosure generally relates to thermoplastic welding techniques. More particularly, the disclosure relates to a thermoplastic welding apparatus and method in which an induced magnetic field is oriented parallel to the plane of the composite parts being welded and concentrates uniform heating at the joint between the composite parts, preventing or minimizing heating of the parts.

BACKGROUND

Fiber-reinforced organic resin matrix composites have a high strength-to-weight ratio, a high stiffness-to-weight radio and desirable fatigue characteristics that make them increasingly popular in aerospace applications. Therefore, composite materials are increasingly being used in the fabrication of structural components for aircraft.

A variety of techniques are used to join composite structures in aerospace and other applications. These fastening techniques include mechanical fastening, adhesive bonding and thermoplastic welding. Thermoplastic welding has numerous advantages over the other fastening techniques including the ability to join thermoplastic composite components at high speeds and with minimum touch labor and little, if any, pretreatments. The welding interlayer (which includes a susceptor and surrounding thermoplastic resin either coating or sandwiching the susceptor) also can simultaneously take the place of shims which are required in mechanical fastening. Therefore, composite welding promises to be an affordable fastening technique.

In the thermoplastic welding of thermoplastic and thermoset composite parts, the susceptor between the composite parts is heated and, in turn, heats and melts the resin of the parts. The melted resin functions as a hot melt adhesive at the welding interlayer between the parts. Upon subsequent cooling, the resin solidifies and secures the composite parts to each other.

In thermoplastic welding, it is desirable to heat the welding interlayer between the composite parts as uniformly as possible. Thermal uniformity and repeatability, as well as the amount of time necessary to develop acceptable tooling and parameters to meet these acceptable thermal uniformity conditions, has been a primary impediment to utilizing induction welding of thermoplastic composites. Extensive experimentation in developing the parameters has been used in applications in which induction parameters and tooling with heat sinks have been used. Often, however, the thermoplastic welding process is not selected due to these thermal uniformity issues.

Therefore, a thermoplastic welding apparatus and method in which an induced magnetic field is oriented parallel to the plane of the composite parts being welded and concentrates uniform heating at the joint between the composite parts, preventing or minimizing heating of the parts, is needed.

SUMMARY

The disclosure is generally directed to a thermoplastic welding apparatus. An illustrative embodiment of the thermoplastic welding apparatus includes a thermoplastic welding tool, at least one tooling surface in the thermoplastic welding tool, a magnetic induction coil in the thermoplastic welding tool and generally encircling the at least one tooling surface and at least one smart susceptor in the thermoplastic welding tool at the at least one tooling surface. The magnetic induction coil is adapted to generate a magnetic flux field oriented generally parallel to a plane of the at least one smart susceptor.

In some embodiments, the thermoplastic welding apparatus may include a thermoplastic welding tool; at least one tooling space in the thermoplastic welding tool; at least one tooling surface in the at least one tooling space; a magnetic induction coil in the thermoplastic welding tool and generally encircling the at least one tooling surface; a first composite part on the tooling surface; at least one smart susceptor on the first composite part; and a second composite part on the at least one smart susceptor. The magnetic induction coil is adapted to generate a magnetic flux field oriented generally parallel to a plane of the at least one smart susceptor.

The disclosure is further generally directed to a thermoplastic welding method. An illustrative embodiment of the thermoplastic welding method includes providing first and second composite parts, placing a smart susceptor between the first and second composite parts and generating a magnetic flux field in parallel relationship to a plane of the smart susceptor.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
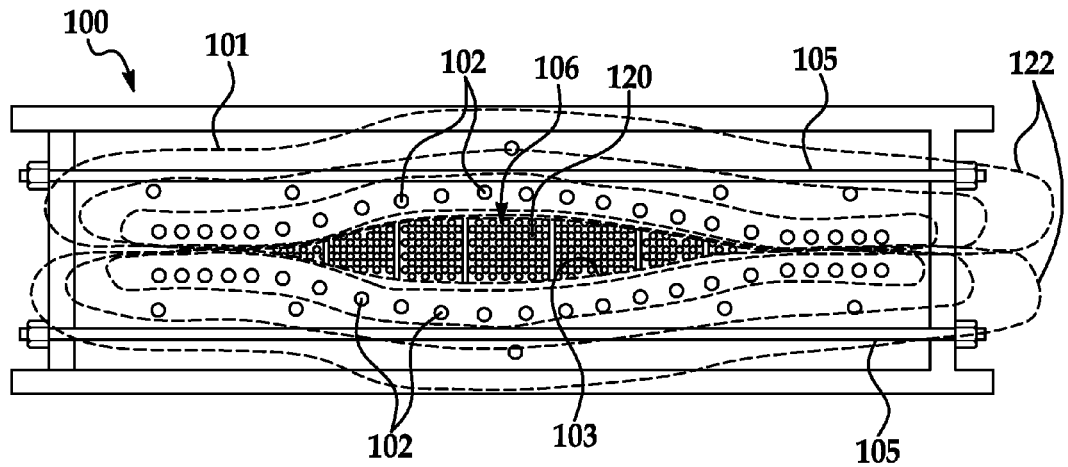
FIG. 1 is a cross-sectional view of an illustrative embodiment of the thermoplastic welding apparatus in exemplary application of the apparatus.
Figure 2:
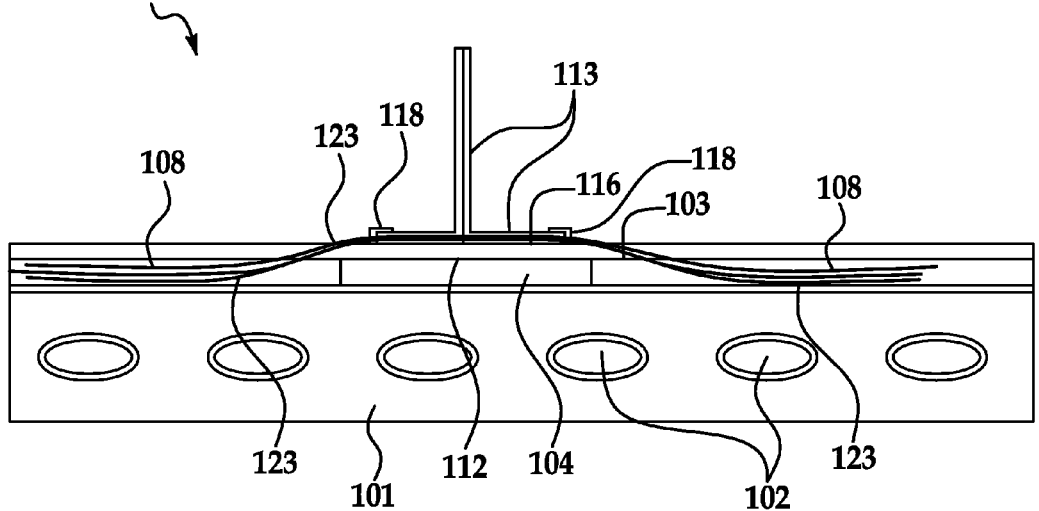
FIG. 2 is a cross-sectional view of a portion of an illustrative embodiment of the thermoplastic welding apparatus of FIG. 1 more particularly illustrating parallel orientation of a magnetic flux field with a smart susceptor between adjacent composite parts in thermoplastic welding of the parts to each other.
Figure 3:
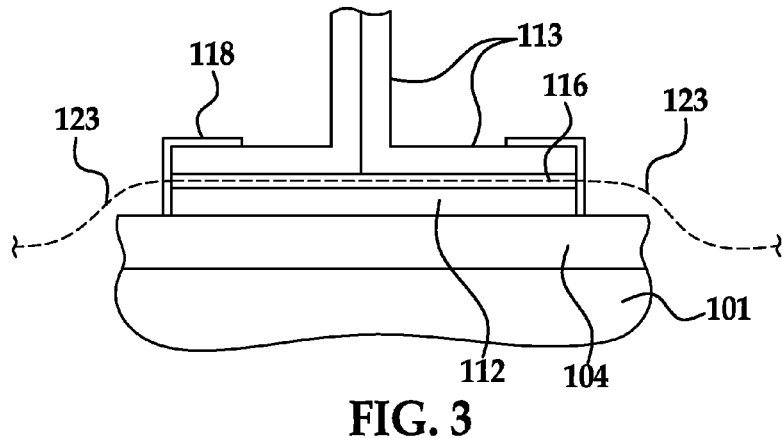
FIG. 3 is an enlarged sectional view of the composite parts and the smart susceptor illustrated in FIG. 2.

Referring initially to FIGS. 1-3, an illustrative embodiment of the thermoplastic welding apparatus is generally indicated by reference numeral 100. The thermoplastic welding apparatus 100 may include a thermoplastic welding tool 101. In some embodiments, the thermoplastic welding tool 101 may be a castable ceramic tool. Reinforcing rods 105, which may be fiberglass, may extend through the thermoplastic welding tool 101.

The thermoplastic welding tool 101 may include a tooling space 106 having at least one tooling surface 103. Magnetic induction coils 102 may extend through the thermoplastic welding tool 101. The magnetic induction coils 102 may be disposed on both sides of the tooling space 106 and may generally surround or envelope the tooling surface 103.

A non electrically-conductive material 104 (FIG. 2) may be disposed generally beneath or adjacent to the tooling surface 103. In some embodiments, the non electrically-conductive material 104 may be an elastomeric material. A ferrite material such as ferrite powder 108, for example and without limitation, may be embedded in the thermoplastic welding tool 101 on at least one side and preferably, on respective sides of the non electrically-conductive material 104. The ferrite powder 108 may be distributed in a plane which is generally parallel to the plane of the smart susceptor 116 and the planes of the first composite part 112 and the second composite part 113, respectively.

In application of the thermoplastic welding apparatus 100, a first composite part 112 is placed on the tooling surface 103 in the tooling space 106 of the thermoplastic welding tool 101. A smart susceptor 116 is placed on the first composite part 112. The smart susceptor 116 may be an electrically-conductive, magnetic metal with high thermal conductivity such as molypermalloy, for example and without limitation. A second composite part 113 is placed on the smart susceptor 116. In some applications, tape 118 may be applied to the edges of the second composite part 113 to form a gas seal over the welding joint defined by the first composite part 112, the smart susceptor 116 and the second composite part 113. A vacuum is pulled on the tooling surface 103 and internal gas pressure 120 applies welding pressure against the second composite part 113, compressing the smart susceptor 116 between the first composite part 112 and the second composite part 113.

The magnetic induction coils 102 generate a magnetic flux field 122 which generally envelopes the first composite part 112 and the second composite part 113, as shown in FIG. 1. In some applications, the magnetic flux field 122 may be an 80 kHz field with 10 amps excitation energy. Due to the high magnetic permeability of the smart susceptor 116, the magnetic flux lines 123 of the magnetic flux field 122 stream into the smart susceptor 116. The ferrite powder 108 focuses the magnetic flux field 122 and eliminates leakage of the magnetic flux field 122 into the first composite part 112 and the second composite part 113. Accordingly, the magnetic flux lines 123 of the magnetic flux field 122 follow the magnetic path of least resistance through the embedded ferrite powder 108 and the smart susceptor 116, as shown in FIG. 3. Consequently, the magnetic flux field 122 sustains a thermal reaction in the smart susceptor 116, heating the smart susceptor 116 to its Curie temperature point. The smart susceptor 116 heats and melts the resin at the welding interface between the first composite part 112 and the second composite part 113. Because the magnetic flux lines 123 of the magnetic flux field 122 encompass the entire part and are oriented parallel to the plane of the smart susceptor 116, minimal heating of the first composite part 112 and the second composite part 113 occurs and heating is focused, concentrated or localized to the welding interface between the first composite part 112 and the second composite part 113. The magnetic induction coils 102 are then turned off and the first composite part 112 and the second composite part 113 allowed to cool. The melted resin at the welding interface solidifies, forming an adhesive bond between the first composite part 112 and the second composite part 113. The composite structure which includes the first composite part 112 and the second composite part 113 may then be removed from the thermoplastic welding tool 101.

It will be appreciated by those skilled in the art that a 0.006" thick molypermalloy smart susceptor 116 is capable of being heated from room temperature to about 670 degrees F. in about 3 minutes when exposed to a 80 kHz magnetic flux field 122 with an equilibrium temperature in the 670~680 degree F. temperature range. A graphite/epoxy composite part 112, 113 does not heat noticeably when exposed to the same magnetic flux field 122. This characteristic enables thin, intrinsically-controlled susceptor materials to be used for thermoplastic composite welding to facilitate even or precise heating and repeatable processing.

Figure 4:
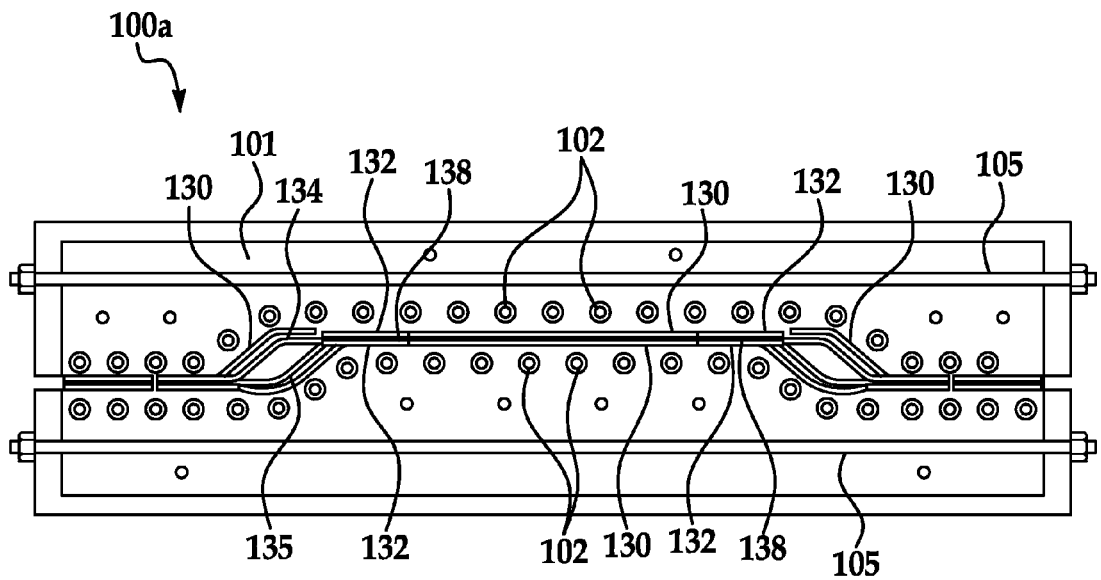
FIG. 4 is a cross-sectional view of an illustrative embodiment of the thermoplastic welding apparatus in alternative application of the apparatus.
Figure 5:
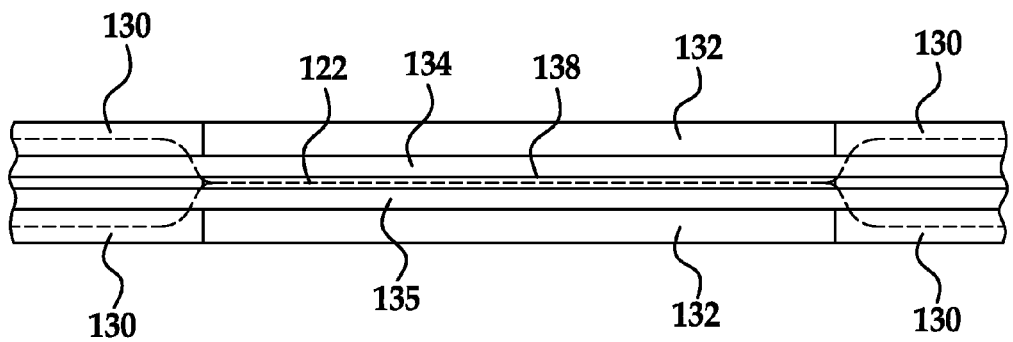
FIG. 5 is an enlarged sectional view of the composite parts and the smart susceptor illustrated in FIG. 4.

Referring next to FIGS. 4 and 5, a cross-sectional view of an illustrative embodiment of the thermoplastic welding apparatus 100a in alternative application of the apparatus is shown. In application of the thermoplastic welding apparatus 100a, multiple smart susceptors 138 may be placed between a first composite part 134 and a second composite part 135 at selected intervals in the thermoplastic welding tool 101 depending on the desired locations of the welding interfaces between the parts. A non electrically-conductive material such as an elastomeric material 132, for example and without limitation, may extend adjacent to the first composite part 134 and the second composite part 135, respectively. A ferrite material 130 may be provided in the thermoplastic welding tool 101 generally on respective sides of the elastomeric material 132. The ferrite material 130 may be oriented in a plane which is generally parallel to the plane of the smart susceptor 108 and the planes of the first composite part 134 and the second composite part 135, respectively. Accordingly, upon energizing of the magnetic induction coils 102, the magnetic flux field 122 (FIG. 5) follows the path of least magnetic resistance through the ferrite material 130 and the smart susceptor 138. The smart susceptor 138 uniformly and selectively heats the welding interface between the first composite part 134 and the second composite part 135 without heating the first composite part 134 and the second composite part 135. Upon cooling, the melted resin at the welding interface solidifies and secures the parts to each other, after which the composite structure including the first composite part 134 an the second composite part 135 is removed from the thermoplastic welding tool 101.

Figure 6:
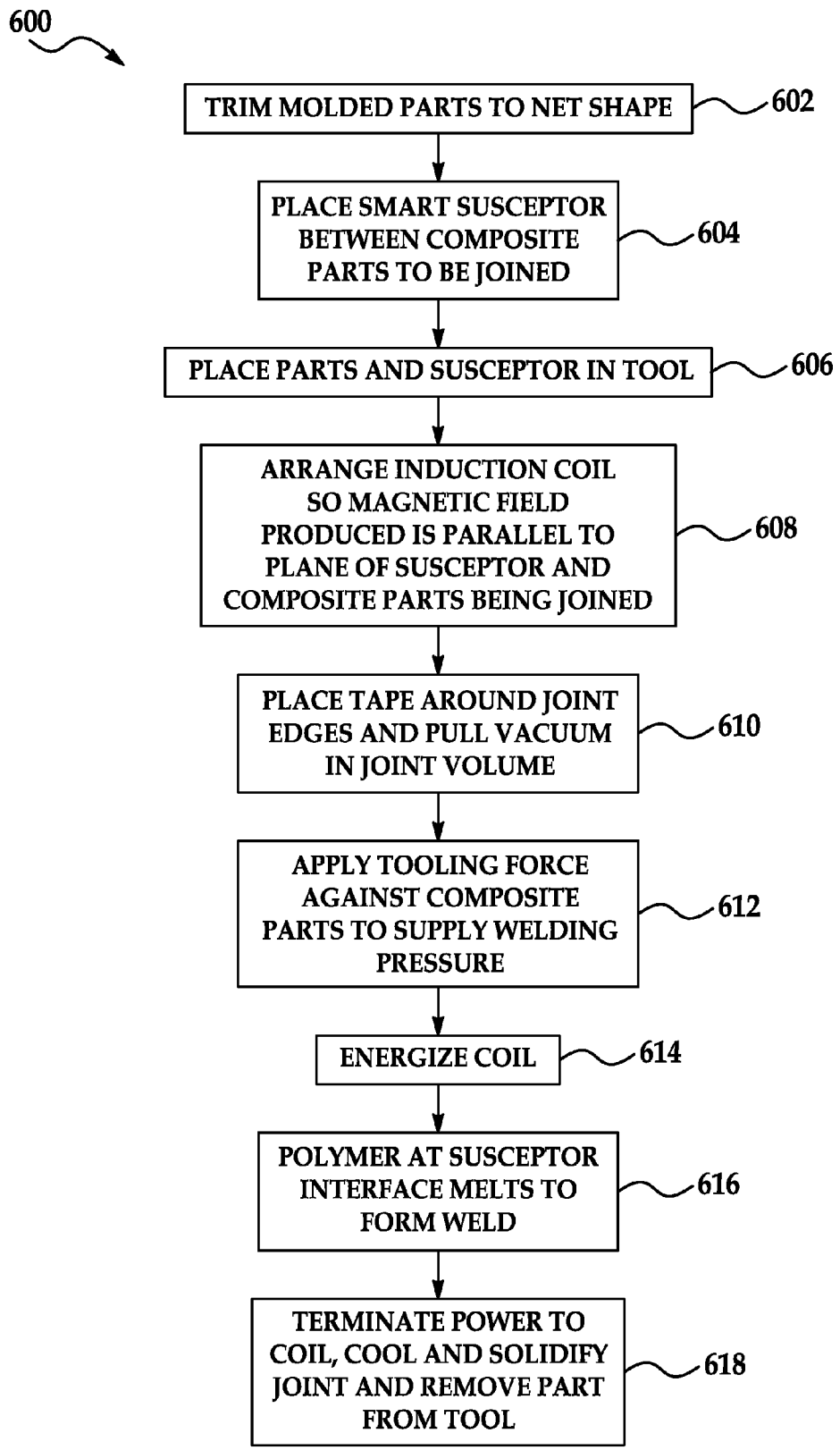
FIG. 6 is a flow diagram of an illustrative embodiment of a thermoplastic welding method.

Referring next to FIG. 6, a flow diagram 600 of an illustrative embodiment of a thermoplastic welding method is shown. In block 602, molded composite parts may be trimmed to net shape. In block 604, a smart susceptor may be placed between the composite parts which are to be joined via thermoplastic welding. In block 606, the composite parts and the susceptor may be placed in a thermoplastic welding tool. In block 608, magnetic induction coils of the tool may be arranged so that a magnetic flux field produced by the induction coils in the tool encompasses the entire part and is oriented parallel to the plane of the smart susceptor and parallel to the planes of the composite parts being joined. In block 610, tape may be placed around the joint edges of the composite parts and a vacuum may be pulled at the joint. In block 612, tooling force may be applied against the composite parts to supply welding pressure. In some embodiments, the tooling force may be a pressurized gas. In block 614, the induction coil may be energized. In block 616, polymeric material at the welding interface between the composite parts may melt to form the weld. In block 618, power to the coil may be terminated to cool and solidify the joint and the composite structure may be removed from the tool.

Figure 7:
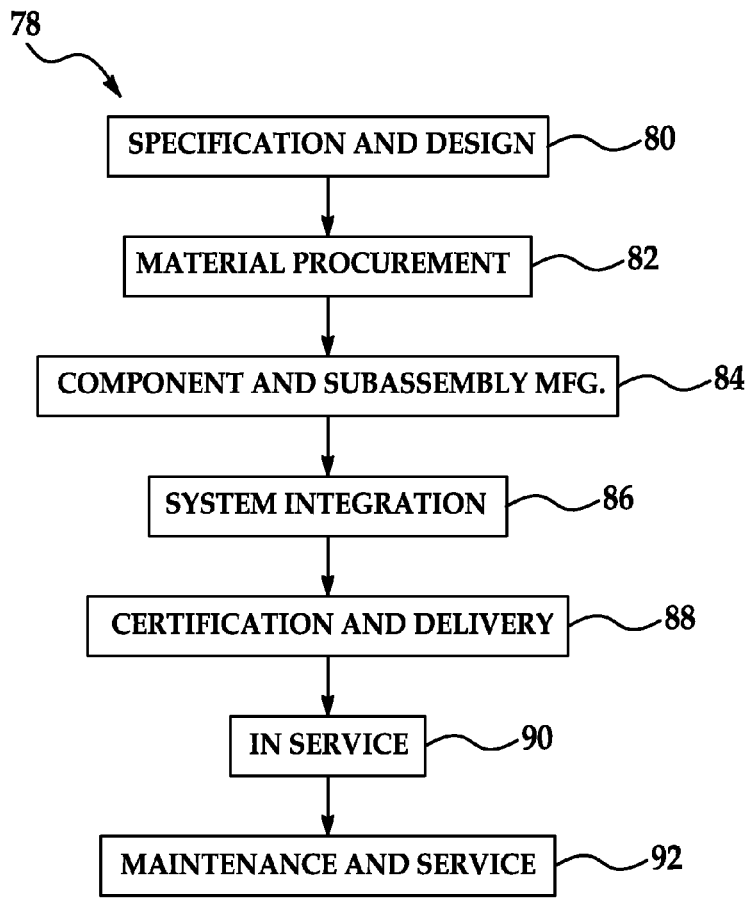
FIG. 7 is a flow diagram of an aircraft production and service methodology.
Figure 8:
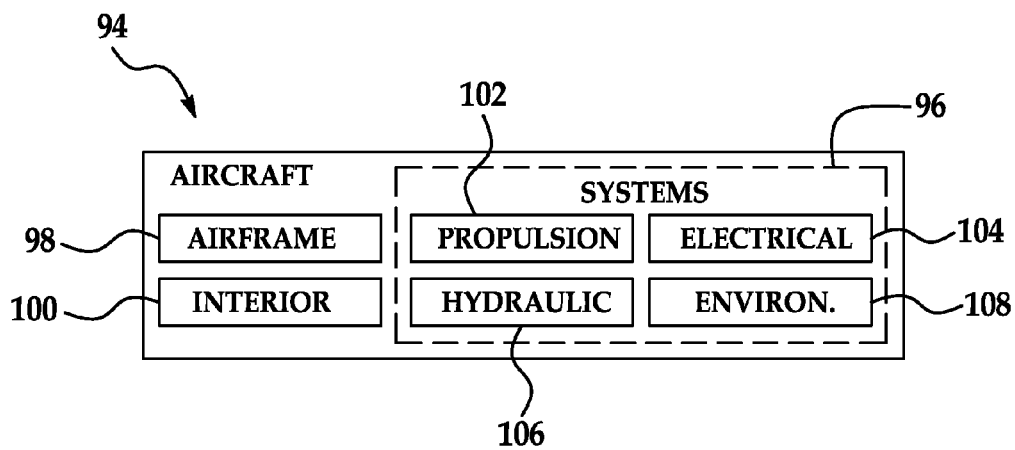
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A thermoplastic welding apparatus comprising:
   a first composite part and a second composite part;
   a thermoplastic welding tool having a tooling surface defining at least a portion of a cavity of the welding tool, the cavity to receive the first and second composite parts;
   a smart susceptor positioned in the cavity of the welding tool between opposing surfaces of the first composite part and the second composite part;
   a tape attached only to a perimeter of the first and second composite parts and in contact with only a portion of the tooling surface defined by the perimeter of the first and second composite parts when the first and second composite parts are positioned in the cavity of the welding tool, the tape to provide a sealed portion in communication with the tooling surface and a non-sealed portion in communication with the cavity;
   a vacuum apparatus to apply a vacuum to the sealed portion such that a welding joint between the sealed portion and the non-sealed portion is exposed to a pressure differential provided by the vacuum in the sealed portion and a pressure provided in the non-sealed portion, the pressure differential to compress the smart susceptor between the first and second composite part while the vacuum is applied to the welding joint during welding; and
   a magnetic induction coil to extend through the welding tool and positioned adjacent the cavity, the magnetic induction coil to generate a magnetic flux field oriented generally parallel to a plane of the smart susceptor.

2. The apparatus of claim 1, wherein the smart susceptor comprises molypermalloy.

3. The apparatus of claim 1, further comprising a ferromagnetic material embedded in the tooling surface and positioned adjacent the cavity to direct the magnetic flux field to the smart susceptor and reduce leakage of the magnetic flux field into one of the parts.

4. The apparatus of claim 1, further comprising a non-electrically conductive material positioned adjacent the tooling surface.

5. The apparatus of claim 4, wherein the non-electrically conductive material comprises an elastomeric material.

6. The apparatus of claim 4, further comprising a ferromagnetic material embedded in the tooling surface adjacent the non-electrically conductive material.

7. The apparatus of claim 6, wherein the ferromagnetic material is embedded in the tooling surface on respective sides of the non-electrically conductive material and the smart susceptor.

8. The apparatus of claim 6, wherein the ferromagnetic material comprises ferrite powder.

9. A thermoplastic welding apparatus comprising:
   a first composite part and a second composite part;
   a thermoplastic welding tool having a tooling space to receive the first and second composite parts, wherein the tooling space defines a tooling surface to receive the first composite part;
   at least one smart susceptor positioned between the first composite part and the second composite part;
   a seal directly attached to only perimeter edges of the first composite part and the second composite part to form a gas seal over a welding joint defined by a portion of the first composite part, a portion of the second composite part and the smart susceptor, wherein tooling surface, the seal, and the portions of the first and second composite parts and the smart susceptor define a joint volume;

a vacuum generator to provide a vacuum to the portions of the first and second composite parts positioned within the joint volume at the welding joint when the first and second composite parts are welded together and to enable a gas pressure within the tooling space to be applied to portions of the first composite part or the second composite part positioned outside of the joint volume such that a pressure differential provided by the vacuum and the gas pressure applies a welding pressure to compress the smart susceptor between the first and second composite parts; and a magnetic induction coil positioned in the thermoplastic welding tool adjacent the at least one tooling surface, the magnetic induction coil to generate a magnetic flux field oriented generally parallel to a plane of the at least one susceptor.

10. The apparatus of claim 9, wherein the smart susceptor comprises molypermalloy.

11. The apparatus of claim 9, further comprising a ferromagnetic material embedded in the tooling surface adjacent the smart susceptor.

12. The apparatus of claim 9, further comprising a non-electrically conductive material positioned in the tooling surface.

13. The apparatus of claim 12, wherein the non-electrically conductive material comprises an elastomeric material.

14. The apparatus of claim 12, further comprising a ferromagnetic material embedded in the tooling surface adjacent the non-electrically conductive material.

15. The apparatus of claim 14, wherein the ferromagnetic material is embedded in the tooling surface on respective sides of the non-electrically conductive material.

16. The apparatus of claim 14, wherein the ferromagnetic material comprises ferrite powder.

17. The apparatus of claim 9, wherein the seal comprises an L-shaped cross-section.

18. The apparatus of claim 17, wherein the seal comprises a first leg attached to a first side surface of the first composite part and a first side surface of the second composite part, and a second leg attached only to a portion of a second surface of the second composite part, the second surface of the second composite part being non-parallel relative to the first surface of the first composite part.

19. A thermoplastic welding apparatus comprising:
a first composite part;
a second composite part;
a smart susceptor positioned between the first and second composite parts;

a tool having a tooling surface to define a cavity to receive the first composite part, the second composite part and the smart susceptor positioned between the first and second composite parts;

a tape attached to a perimeter of the first composite part and in contact with only a portion of the tooling surface about perimeter edges of the first composite part and the second composite part, the tape to form a gas seal within a perimeter defined by the tape and defined by the smar susceptor and the first and second composite parts positioned within the cavity;

a vacuum generator to apply a vacuum to the tooling surface, the tape creating a seal between at least a portion of the tooling surface positioned inside the perimeter edges defined by the tape and the cavity, the seal to enable a welding pressure provided by a pressure differential between an internal gas pressure in the cavity and the vacuum provided to the tooling surface inside the perimeter of the tape during a welding process to cause the smart susceptor to compress between the first composite part and the second composite part; and a first magnetic induction coil provided in the tool, the first magnetic induction coil to generate a first magnetic flux field adjacent the smart susceptor when the smart susceptor is positioned within the thermoplastic welding apparatus.

20. The apparatus of claim 19, further comprising a second magnetic inductor provided in the second tool adjacent the tooling surface, the second magnetic inductor to generate a second magnetic flux field adjacent the smart susceptor.

21. The apparatus of claim 19, further comprising a ferromagnetic material embedded in the tooling surface, the ferromagnetic material to direct the magnetic flux field toward the smart susceptor and away from the first and second composite parts.

22. The apparatus of claim 19, further comprising a non-electrically conductive material to be positioned adjacent the tooling surface.

23. The apparatus of claim 22, wherein the vacuum enables the parts and the smart susceptor to be held in contact when the parts are being welded together.

24. The apparatus of claim 23, wherein the vacuum is provided within a joint volume inside a perimeter defined by the seal.

25. The apparatus of claim 24, wherein a tooling force is applied to the parts to supply a welding pressure when the vacuum is provided within the joint volume.

* * * * *

UNITED STATES PATENT AND TRADEMARK OFFICE
CERTIFICATE OF CORRECTION

PATENT NO. : 9,586,362 B2
APPLICATION NO. : 13/109061
DATED : March 7, 2017
INVENTOR(S) : Marc R. Matsen et al.

It is certified that error appears in the above-identified patent and that said Letters Patent is hereby corrected as shown below:

In the Claims

- Column 6, Line 64 (Claim 9): replace "seal" with "tape"
- Column 7, Lines 1-4 (Claim 9): delete "wherein tooling surface, the seal, and the portions of the first and second composite parts and the smart susceptor define a joint volume;"
- Column 7, Lines 5-15 (Claim 9): replace "a vacuum generator to provide a vacuum to the portions of the first and second composite parts positioned within the joint volume at the welding joint when the first and second composite parts are welded together and to enable a gas pressure within the tooling space to be applied to portions of the first composite part or the second composite part positioned outside of the joint volume such that a pressure differential provided by the vacuum and the gas pressure applies a welding pressure to compress the smart susceptor between the first and second composite parts;" with "a vacuum generator to provide a vacuum through the tooling surface at the welding joint within the perimeter of the tape when the first and second composite parts are welded together, and wherein an internal gas pressure within the tooling space is to apply a welding pressure against the second composite part to compress the smart susceptor between the first and second composite parts;"
- Column 7, Line 39 (Claim 17): replace "seal" with "tape"
- Column 7, Line 41 (Claim 18): replace "seal" with "tape"
- Column 8, Line 5 (Claim 19): delete "a perimeter of" before the first composite part and add "and the second composite part" after the first composite part
- Column 8, Line 11 (Claim 19): replace "smar" with "smart"
- Column 8, Line 30 (Claim 20): replace "inductor" with "induction coil"
- Column 8, Lines 31-32 (Claim 20): replace "second tool adjacent the tooling surface," with "tool,"
- Column 8, Line 32 (Claim 20): replace "inductor" with "induction coil"

Signed and Sealed this
Twenty-fifth Day of July, 2017

Joseph Matal
*Performing the Functions and Duties of the
Under Secretary of Commerce for Intellectual Property and
Director of the United States Patent and Trademark Office*